United States Patent [19]
Cohen

[11] Patent Number: 6,005,779
[45] Date of Patent: Dec. 21, 1999

[54] RECTIFICATION AND INVERSION CIRCUITS

[75] Inventor: Isaac Cohen, Dix Hill, N.Y.

[73] Assignee: Lambda Electronics Incorporated, Melville, N.Y.

[21] Appl. No.: 09/268,489

[22] Filed: Mar. 11, 1999

Related U.S. Application Data

[60] Provisional application No. 60/107,624, Nov. 9, 1998.

[51] Int. Cl.$^6$ ............................ H02M 3/335; H02M 7/06; H02M 7/217
[52] U.S. Cl. ............................ 363/16; 363/126; 363/127; 363/17; 363/133
[58] Field of Search .................................... 363/16, 17, 84, 363/90, 98, 126, 127, 132, 24, 25, 133, 134

[56] References Cited

U.S. PATENT DOCUMENTS 5,508,903  4/1996  Alexndrov ................................ 363/16
5,907,479  5/1999  Leu ............................................ 363/16

OTHER PUBLICATIONS

A Stable Load–Invariant High–Frequency SCR Series Resonant Inverter for Radar Transmitter Applications (Robert C. Cole, International Telephone and Telegraph, Gilfillen, Inc.), pp. 14–18. (No date).

2800 Watt Series Inverter DC Power Supply (D. L. Cronin, Electric Power Processing Dept., Redondo, Beach, CA), pp. 117–123. (No date).

*Primary Examiner*—Y. J. Han
*Attorney, Agent, or Firm*—David Barron; Jules Jay Morris; Terrence Martin

[57] ABSTRACT

A circuit used to convert a DC input to an AC output includes a pair of series circuits. Each of the series circuits is in parallel with the DC input and includes a switch and a transformer primary. A capacitor couples the two series circuits, and is attached to each series circuit at a node between the respective transformer primary and switch. A secondary on the transformer provides the AC output. Optionally, multiple transformers may be utilized. Similar topologies may be used for rectification instead of inversion.

22 Claims, 7 Drawing Sheets

RECTIFICATION AND INVERSION CIRCUITS

CROSS REFERENCE TO RELATED APPLICATIONS

This patent application is related to co-pending Provisional Patent Application entitled: "Rectification Circuits", filed Nov. 9, 1998, Ser. No. 60/107,624, which is incorporated by reference herein in its entirety.

BACKGROUND OF THE INVENTION

Often, electrical devices require the conversion of a DC voltage to an AC voltage. This function is referred to as the inversion of an electrical voltage and has previously been performed using several circuit topologies.

A first prior art circuit topology used to invert an electrical voltage is the push/pull circuit shown in FIG. 1. A DC source 13 (with optional filter capacitor 15 connected in parallel thereto) provides the DC voltage to be inverted. Two switches, 17 and 19 connect at a common node and to respective ends of a tapped transformer secondary 12. The center tap of secondary 12 connects to one terminal of DC source 13, with the other terminal of DC source 13 connecting to the common connection between the switches.

Operationally, alternate engagement of the switches 17 and 19 result in the generation of AC voltage at secondary 10. This topology has the disadvantage of the voltage on the switches being unclamped, and current only flowing in one of the two half-windings at a time.

Another prior art topology for an inverter circuit showing in FIG. 2, and is commonly understood to be the full-bridge type circuit. In this topology, again, a voltage source $V_{IN}$ 13 is connected in parallel with an optional filter capacitor 15 and provides the DC input for the circuit. In parallel with the DC input are two pairs of series connected switches, namely the series combination of $SW_3$ 27 and $SW_4$ 29 and the series combination of $SW_1$ 23 and $SW_2$ 25. A primary 14 of transformer 21 connects center nodes between the pairs of switches. The AC output is produced on a secondary 10 of transformer 21.

Operationally, the pairs of switches alternately engage, that is, $SW_1$ 23 and $SW_4$ 29 are simultaneously closed, and then the next switch pair, $SW_2$ 25 and $SW_3$ 27 are closed. This alternate engagement of the switches results in the AC voltage being generated on secondary 10. The full-bridge topology has the disadvantage of requiring the use of four switches, two of whom must conduct in series at any time, thereby resulting in complexity and additional switching losses.

Turning lastly to the prior-art half-bridge topology of FIG. 3, again a DC source $V_N$ 13 provides the DC input which is connected in parallel with a series combination of capacitors 37 and 39 and a series combination of switches $SW_1$ 31 and $SW_2$ 33. A transformer 35 has a primary 14 connected between a center node of the two series combinations of capacitors and switches, with transformer secondary 10 providing the AC output. Alternate operation of switches $SW_1$ and $SW_2$ result in the generation of the AC voltage output.

The half-bridge topology has the disadvantage of only applying one-half of the input voltage to the primary of the transformer at any given time.

Accordingly, the present invention is directed toward inversion circuits (and corresponding rectification circuits) which overcome the above-discussed defficiencies in the prior art.

SUMMARY OF THE INVENTION

Briefly described, in a first aspect, the present invention comprises a circuit to convert a DC voltage received at a DC input to an AC voltage. The circuit includes first and second series circuits, a capacitor and a transformer.

The first series circuit is connected in parallel with the DC input and includes a first switch and a first transformer primary; while the second series circuit is also connected in parallel with the DC input and includes a second switch and a second transformer primary. The capacitor is connected between a first node within the first series circuit and a second node within the second series circuit, wherein the first node is between the first switch and the first transformer primary, and the second node is between the second switch and the second transformer primary. Moreover, a transformer secondary is magnetically coupled to at least one of the transformer primaries and provides the AC voltage.

As an enhancement, the first transformer primary and the second transformer primary may be primaries of a common transformer, and may be magnetically coupled to a same transformer core.

In another embodiment, the first transformer primary may be magnetically coupled to a first transformer and the second transformer primary is magnetically coupled to a second transformer. In this embodiment, each of the two transformers has a secondary, the secondaries being electrically connected in parallel or series.

In another embodiment, the present invention includes a circuit to convert a DC voltage received at a DC input to an AC voltage. The circuit includes a series circuit, first and second switches and a transformer.

The series circuit is connected in parallel with the DC input and includes first and second transformer primaries, wherein the primaries are coupled in series through a capacitor. The first switch is connected in parallel across the series combination of the capacitor and the second transformer primary, while the second switch is connected in parallel across the series combination of the capacitor and the first transformer primary. A transformer secondary magnetically coupled to at least one of the transformer primaries provides the AC voltage.

As an enhancement, the transformer primaries may be of a common transformer, magnetically coupled to a same transformer core. As another possibility, the primaries may be magnetically coupled to different transformers.

As a further enhancement, there may be two transformer secondaries corresponding to the two transformer primaries, the secondaries being electrically connected in parallel or series.

As further enhancements to the above embodiments, the circuit may include a capacitor in parallel with the DC input. Also, the switches may be semiconductor switches, for example, field-effect transistors.

In yet another embodiment, the present invention includes a circuit to convert an AC voltage received at a primary of a transformer to a DC voltage. The circuit includes first and second series circuits and a capacitor.

The first series circuit includes a first rectifier and a first secondary of the transformer, while the second series circuit is connected in parallel with the first series circuit and includes a second rectifier and a second secondary of the transformer. The capacitor is connected between a first node within the first series circuit and a second node within the second series circuit, wherein the first node is between the first rectifier and the first secondary, and wherein the second node is between the second rectifier and the second secondary. The DC voltage is produced across the parallel combination of the series circuits.

As an enhancement, the circuit may include a capacitor in parallel with the first and second series circuits.

As a further enhancements, the rectifiers may be, for example, diodes or synchronous rectifiers, or a combination of the two. In the synchronous rectifier embodiments, a control input of the synchronous rectifier may be driven by, for example, a winding of the transformer.

Advantageously, the present invention facilitates inversion and rectification in a more efficient manner than was heretofore possible, combining the advantages, while avoiding the shortcomings, of the prior art.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

The present invention includes a new topology that features the desirable characteristics from circuits previously realized. These characteristics are:

a. The full input voltage is applied across transformer primaries during the conduction of these switches;

b. The current of the primaries flows through only one switch at a time; and c. The voltage of the switches is clamped to the voltage equal to twice the input voltage.

Moreover, by replacing the switches of the present invention with rectifiers, the techniques disclosed herein can be used for rectification instead of inversion.

Figure 1:
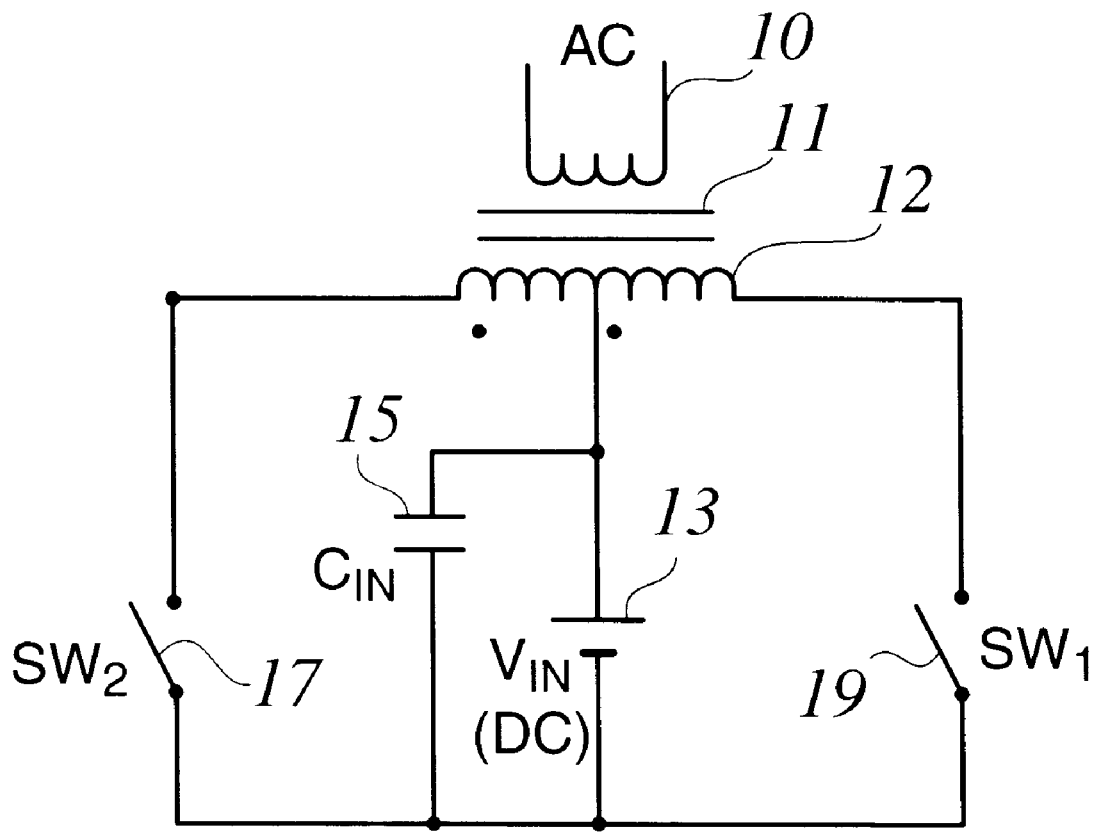
FIGS. 1–3 depict push/pull, full-bridge, and half-bridge inverter topologies, respectively, according to the prior-art.
Figure 2:
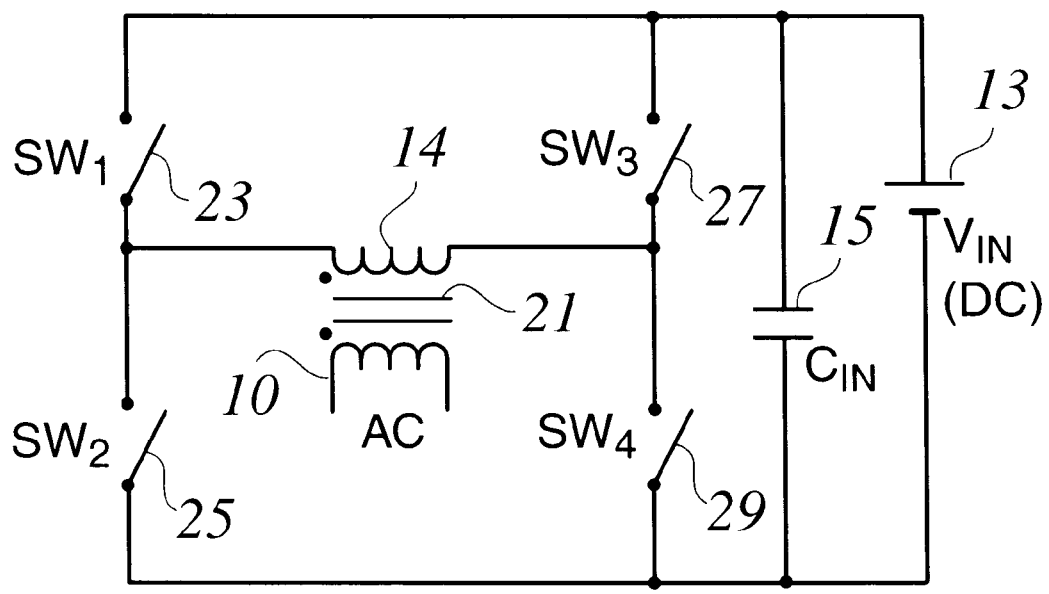
Figure 3:
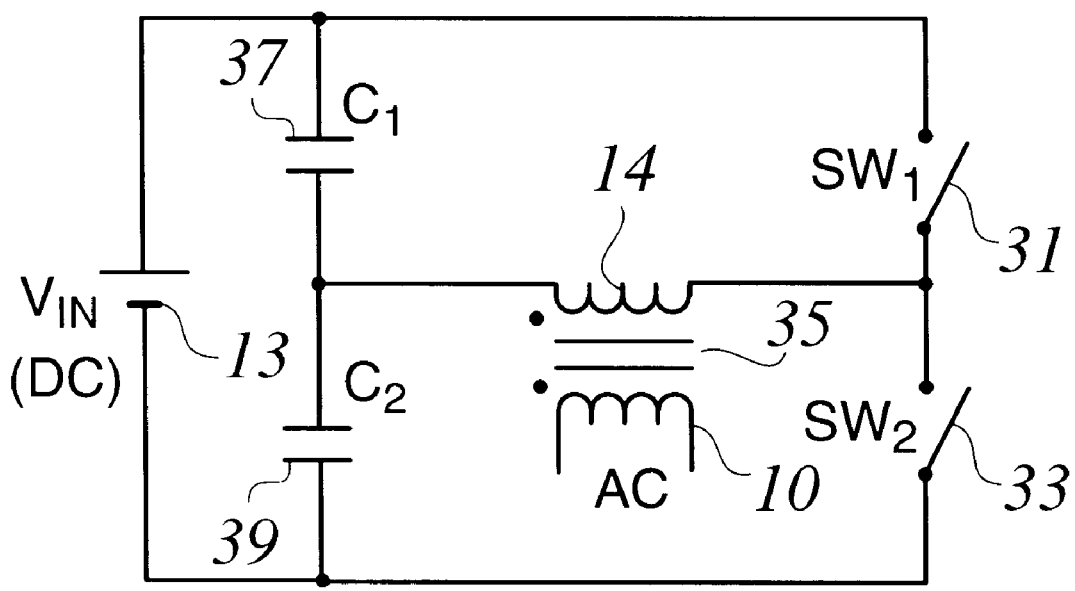
Figure 4:
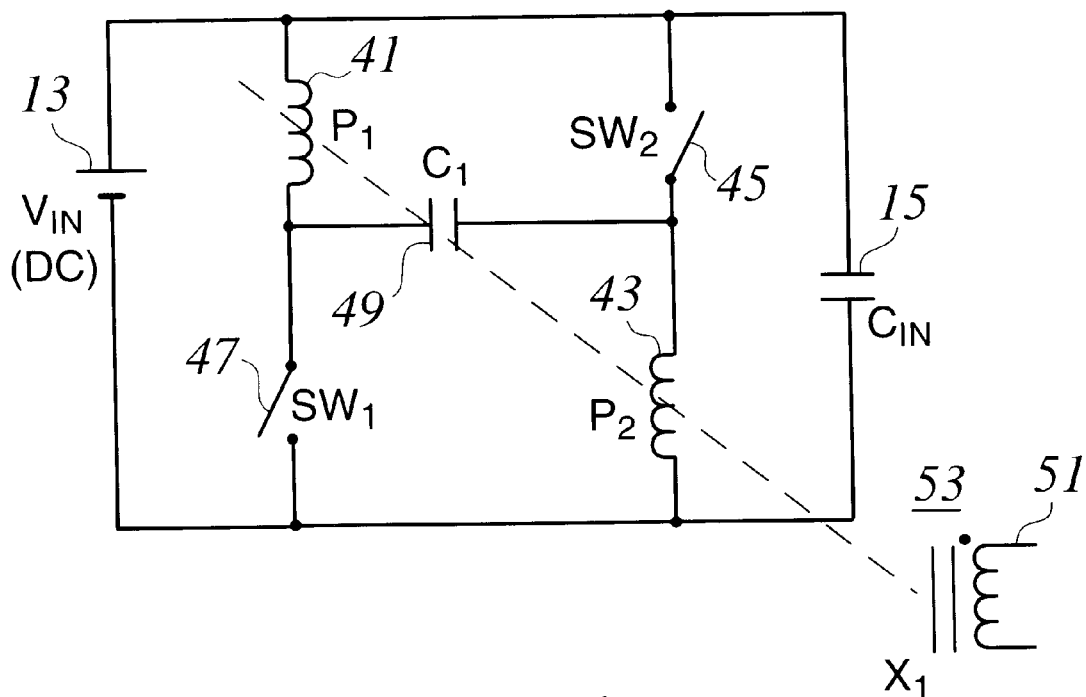
FIG. 4 depicts an inverter circuit in accordance with one embodiment of the present invention.

Turning first to the embodiment of FIG. 4, a DC to AC inverter circuit is shown. A voltage source 13 provides a DC input to the inversion circuit (a filter/storage capacitor 15 may optionally be connected in parallel with the DC input). In parallel with the DC input are two series circuits. The first series circuit includes primary 41 of transformer 53 and switch $SW_1$ 47. The second series circuit includes switch $SW_2$ 45 and primary 43 of transformer 53. Within each series circuit, there is a node at which point the respective switch connects with its respective primary. These nodes are coupled by capacitor $C_1$ 49. The circuit's AC output is provided at secondary 51 of transformer 53. In this example, the primaries 41 and 43 of transformer 153 have equal number of terms.

Operationally, when DC voltage is supplied to the circuit of FIG. 4, it charges capacitor $C_1$ 49 via the two primary windings (41 and 43) to a value $V_{IN}$.

Switches $SW_1$ 47 and $SW_2$ 45 are operated sequentially, with a time delay between their conduction periods, to produce the AC output. This time delay may be adjusted from a zero value up to a predetermined value in order to obtain various switching affects (knowing the art such as zero voltage switching, modulation, etc). The switch control circuits used to perform such switch control functions are well known in the art.

When $SW_1$ 47 is on, it applies the input voltage $V_{IN}$ across primary $P_1$ 41, and connects capacitor $C_1$ 49 (which is charged to a voltage V1) across primary winding $P_2$ 43. If capacitor $C_1$ 49 has a large value, it will act as a voltage source equal to the input voltage $V_{IN}$ so both windings will be active.

After $SW_1$ 47 turns off and $SW_2$ 45 turns on, the input voltage of $V_{IN}$ will be applied to primary $P_2$ 43; and the voltage across capacitor $C_1$ will be applied to primary $P_1$ 41. Thus, the polarity of the voltage applied to the primaries is now reversed.

As a result of the sequential operation $SW_1$ 47 and $SW_2$ 45, an AC voltage will be generated that will be available from secondary 51.

Figure 5:
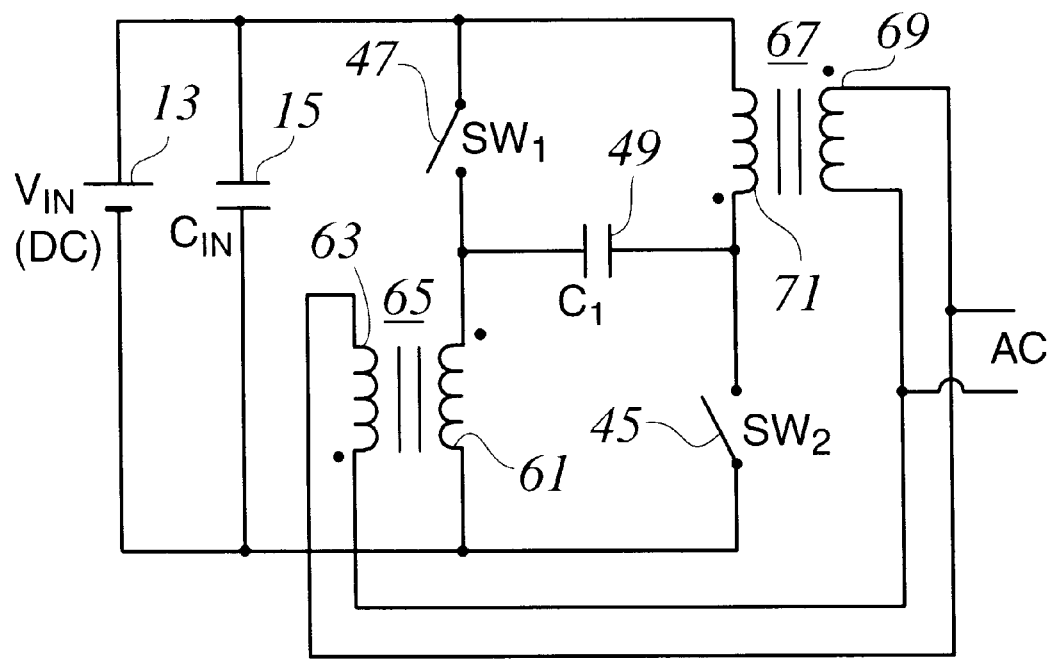
FIGS. 5–5A depicts inverter circuits using two transformers in accordance with other embodiments of the present invention.
Figure 5A:
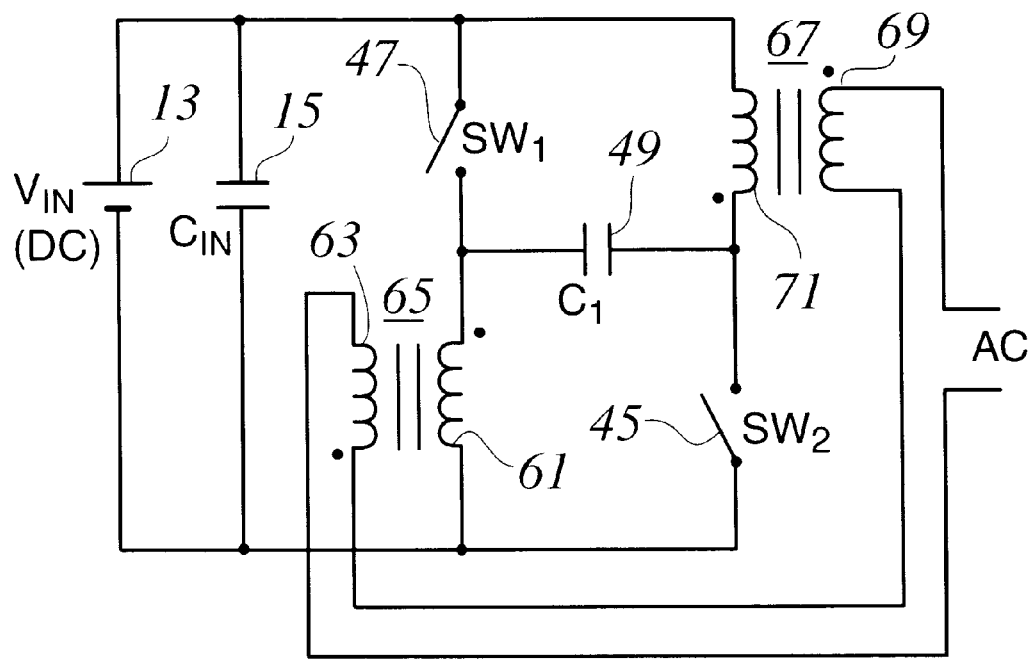

An alternate embodiment to that shown in FIG. 4 is depicted in FIG. 5. In this embodiment, the single transformer 53 has been replaced with two transformers 65 and 67. Primary 61 of transformer 65 corresponds to primary 41 of FIG. 4, while primary 71 of transformer 67 (FIG. 5) corresponds to primary $P_2$ of FIG. 4. Secondarys 63 and 69 are connected in parallel to produce the AC output. The circuit of FIG. 5 has the advantage that if high operating frequencies require multiple winding interleaving, the use of two transformers reduces the need for such interleaving. Per the embodiment of FIG. 5A, secondaries 63 and 69 may also be connected in series.

Figure 6:
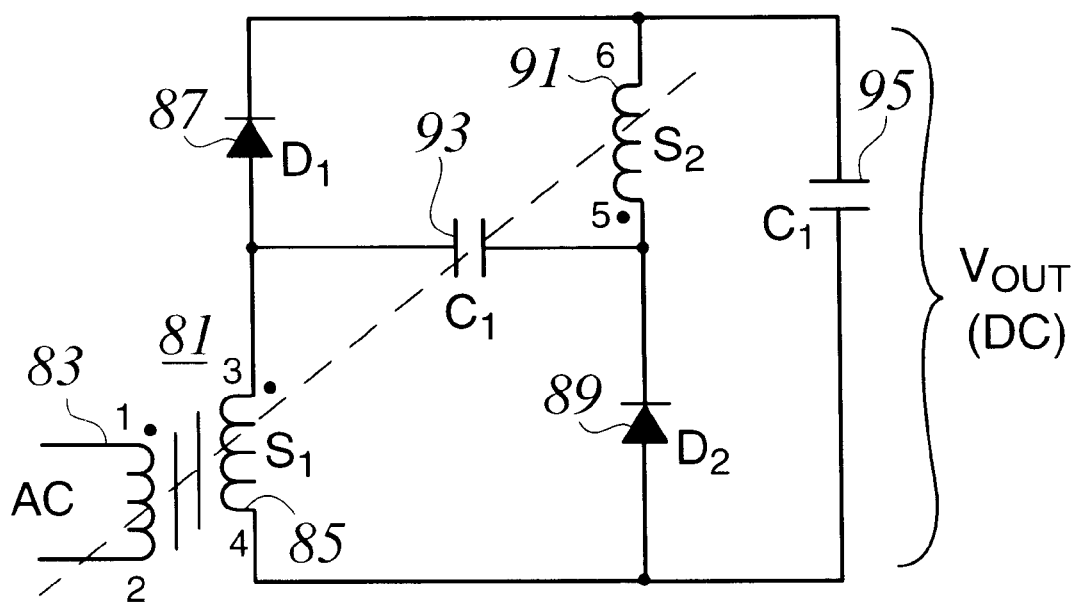
FIGS. 6 and 7 depict rectifier circuits in accordance with the techniques of the present invention.

The topology of the present invention may be modified to operate as a rectifier rather than an inverter. One embodiment of a rectification circuit in accordance with the present invention is depicted in FIG. 6.

A transformer 81 has a primary 83 which is the AC input of the rectifier circuit shown. A secondary 85 of transformer 81 is connected in series with a diode $D_1$ 87. This series combination of secondary 85 and diode 87 is connected in parallel with another series circuit including a secondary 91 (of transformer 81) in series with a diode $D_2$ 89. A center node within these two series circuits is coupled by capacitor $C_1$ 93. Furthermore, the DC output is taken across these two parallel connected series circuits. Storage/filter capacitor $C_2$ 95 is also connected across the DC output. 3 and 5 of secondaries 85 and 91, respectively, will also become positive.

Secondary $S_2$ 91 will charge capacitor $C_1$ 93 via diode 87 to a voltage $V_{OUT}$. Furthermore, secondary $S_1$ 85 will charge capacitor $C_2$ 95 to an identical voltage $V_{OUT}$, via the same diode.

When the polarity of the input voltage reverses, terminals 6 and 4 of secondaries 85 and 91 will become positive, and now secondary $S_1$ 85 will charge capacitor $C_1$ 93, and secondary $S_2$ 91 will charge capacitor $C_2$ 95. The charging of both capacitors $C_1$ 93 and $C_2$ 95 will now be effected by diode $D_2$ 89.

As a result, a DC voltage will appear across the DC output (i.e., across $C_2$), with capacitors $C_1$ and $C_2$ being effectively connected in parallel and acting as the output filter.

Figure 7:
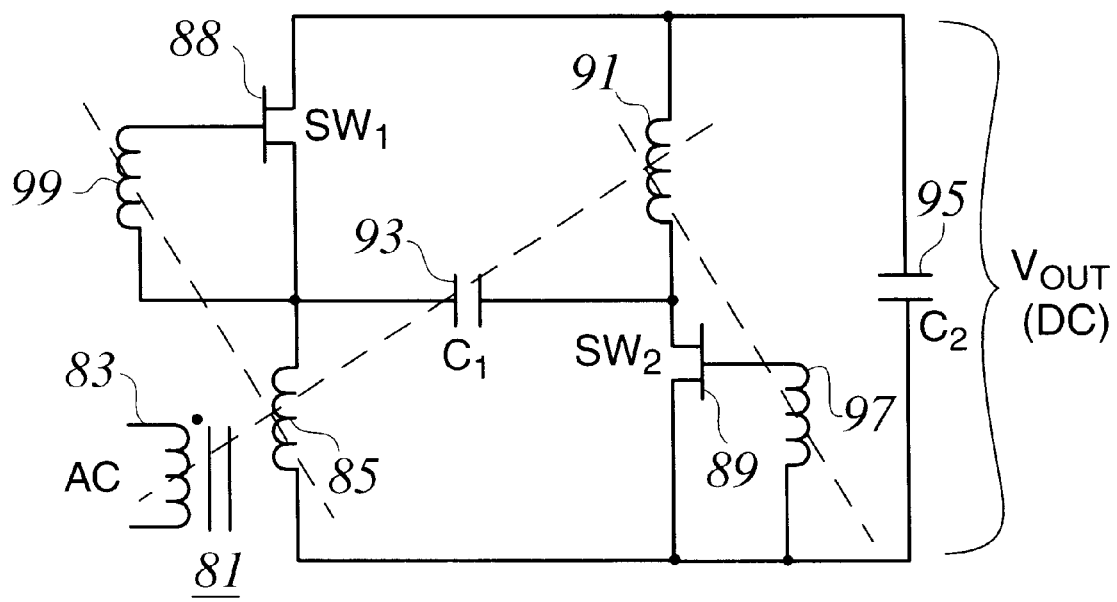

In the embodiment of FIG. 6, diodes are used as rectifiers. However, the rectification can also include what is known as synchronous rectification. One example of an embodiment using synchronous rectifiers instead of diodes is shown in FIG. 7. Switches SW$_1$ 88 and SW$_2$ 89 are synchronous rectifiers, and are, in this example, MOSFETs. Further, the gates of the MOSFETs are driven by further secondary windings 99 and 97.

Operationally, switches SW$_1$ 88 and SW$_2$ 89 are turned on and off at appropriate times, thereby rectifying the voltage appearing on windings 85 and 91 and generating a DC voltage across C$_1$ 93, C$_2$ 95 and hence, the DC output in a manner similar to the embodiment of FIG. 6. Although gate drive by an auxilliary winding is shown as the control of the MOSFETs in this embodiment, other control techniques known in the art can be used including, for example, drive by a digital controller, or other self-driven embodiments.

In the embodiments shown herein switching functions can be performed by any suitable devices known in the art, or later developed. In the preferred embodiments, field-effect transistors are used, however the invention may also use other appropriate switching techniques such as bipolar transistors, IGBT's, or even electromechanical, or micro-machined switch technologies.

The technologies of the present invention can be combined with topologies of the prior art. For example, in a DC—DC converter, the inversion may be performed by a topology of the prior art and the rectification by the topology of the present invention, or vise versa. Furthermore, both the inversion and rectification can be performed by the techniques disclosed herein.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

I claim:

1. A circuit to convert a DC voltage received at a DC input to an AC voltage comprising:
   a first series circuit connected in parallel with said DC input and including a first switch and a first transformer primary;
   a second series circuit connected in parallel with said DC input and including a second switch and a second transformer primary;
   a capacitor connected between a first node within said first series circuit and a second node within said second series circuit, wherein said first node is between said first switch and said first transformer primary, and wherein said second node is between said second switch and said second transformer primary; and
   a transformer secondary magnetically coupled to at least one of said transformer primaries and providing said AC voltage.

2. The circuit of claim 1, wherein said first transformer primary and said second transformer primary are primaries of a common transformer, and are magnetically coupled to a same transformer core.

3. The circuit of claim 1, wherein said first transformer primary is magnetically coupled to a first transformer and said second transformer primary is magnetically coupled to a second transformer.

4. The circuit of claim 3, wherein said transformer secondary comprises a first transformer secondary magnetically coupled to said first transformer, and wherein said circuit further comprises a second transformer secondary magnetically coupled to said second transformer, said secondaries being electrically connected in one of parallel and series.

5. The circuit of claim 1, further including a capacitor in parallel with said DC input.

6. The circuit of claim 1, wherein said switches comprise semiconductor switches.

7. The circuit of claim 6, wherein said switches comprise field effect transistors.

8. A circuit to convert a DC voltage received at a DC input to an AC voltage comprising:
   a series circuit connected in parallel with said DC input and comprising a first transformer primary and a second transformer primary, said primaries being coupled in series through a capacitor;
   a first switch connected in parallel across the series combination of said capacitor and said second transformer primary;
   a second switch connected in parallel across the series combination of said capacitor and said first transformer primary;
   a transformer secondary magnetically coupled to at least one of said transformer primaries and providing said AC voltage.

9. The circuit of claim 8, wherein said first transformer primary and said second transformer primary are primaries of a common transformer, and are magnetically coupled to a same transformer core.

10. The circuit of claim 8, wherein said first transformer primary is magnetically coupled to a first transformer and said second transformer primary is magnetically coupled to a second transformer.

11. The circuit of claim 10, wherein said transformer secondary comprises a first transformer secondary magnetically coupled to said first transformer, and wherein said circuit further comprises a second transformer secondary magnetically coupled to said second transformer, said secondaries being electrically connected in one of parallel and series.

12. The circuit of claim 8, further including a capacitor in parallel with said DC input.

13. The circuit of claim 8, wherein said switches comprise semiconductor switches.

14. The circuit of claim 13, wherein said switches comprise field effect transistors.

15. A circuit to convert an AC voltage received at a primary of a transformer to a DC voltage, said circuit comprising:
   a first series circuit including a first rectifier and a first secondary of said transformer;
   a second series circuit, connected in parallel with said first series circuit and including a second rectifier and a second secondary of said transformer;
   a capacitor connected between a first node within said first series circuit and a second node within said second series circuit, wherein said first node is between said first rectifier and said first secondary, and wherein said second node is between said second rectifier and said second secondary; and
   wherein said DC voltage is produced across said parallel combination of said series circuits.

16. The circuit of claim 15, wherein said rectifiers comprise diodes.

17. The circuit of claim 16, wherein said rectifiers comprise synchronous rectifiers.

18. The circuit of claim 17, wherein said first rectifier comprises a first synchronous rectifier.

19. The circuit of claim 18, wherein said first synchronous rectifier includes a control input, and wherein said transformer further includes a third secondary coupled to said control input of said first synchronous rectifier for control thereof.

20. The circuit of claim 19, wherein said second rectifier comprises a second synchronous rectifier.

21. The circuit of claim 20, wherein said second synchronous rectifier includes a control input, and wherein said transformer further includes a fourth secondary coupled to said control input of said second synchronous rectifier for control thereof.

22. The circuit of claim 15, further including a capacitor in parallel with said first and second series circuits.

* * * * *